UNITED STATES PATENT OFFICE.

WILLIAM GEORGE WHIFFEN, OF LONDON, ENGLAND.

EMETINE SALTS AND PROCESS OF MAKING SAME.

SPECIFICATION forming part of Letters Patent No. 650,696, dated May 29, 1900.

Application filed June 2, 1898. Serial No. 682,413. (No specimens.)

*To all whom it may concern:*

Be it known that I, WILLIAM GEORGE WHIFFEN, manufacturing chemist, a subject of the Queen of Great Britain, residing at Battersea, in the city of London, England, have invented a new and useful Process for the Preparation of Emetine, (for which I applied for Letters Patent in Great Britain on the 12th of November, 1897, No. 26,442, and in Germany on the 16th of November, 1897,) of which the following is a specification.

My invention relates to an improved process for obtaining the alkaloid of ipecacuanha, known as "emetine." This alkaloid has hitherto been obtainable in the pure state, or approximately pure state, only by great care and trouble and at very considerable cost in the form of the hydrochlorate, and the commercial salt thus obtained is usually more or less impure and contaminated with excess of acid. By my invention I readily produce a perfectly-neutral crystalline salt of emetine of great purity and entirely free from cephaeline, and therefore well suited for various purposes to which the present hydrochlorate salt is inapplicable.

I have discovered by experiment and research that the hydrobromate of emetine is a salt possessing special qualities, and particularly that it crystallizes readily, whereas the hydrobromate of cephaeline crystallizes with difficulty and the hydrobromates of certain other alkaloids, more or less present in the root, are uncrystallizable.

In carrying my invention into effect I prefer to operate as follows: The finely-powdered root is mixed intimately with about ten per cent. of lime and the whole is moistened with water. The mixture is then extracted by warm amylic alcohol or by ether or by a suitable hydrocarbon immiscible with water. The immiscible solution is then agitated with a weak aqueous solution of hydrobromic acid and the aqueous solution concentrated sufficiently for the emetine hydrobromate to crystallize upon cooling. These crystals are almost pure and the mother-liquor contains the other alkaloids present. The hydrobromate of emetine is finally treated with animal charcoal and further purified by recrystallization from water, whereby a neutral salt is produced in a state of purity unobtainable by any other known means.

The reaction between the extract of the root and the hydrobromic-acid solution may be aided, if needful, by means of heat, or, if found desirable, in certain cases I may effect the reaction in the cold and condense the resulting liquid by other means than by heating—as, for instance, by evaporation *in vacuo* at or about the ordinary atmospheric temperature.

What I claim is—

1. The process for treating fluid extract of ipecacuanha-root, which consists in adding aqueous solution of hydrobromic acid to the said extract, agitating the liquids together, concentrating the aqueous solution until hydrobromate of emetine crystallizes out, and separating the crystals from the mother-liquor.

2. The process for separating emetine from other alkaloids of ipecacuanha-root, which consists in treating the root with lime, extracting the alkaloids by a solvent immiscible with water, treating the solution with aqueous solution of hydrobromic acid, and concentrating the said aqueous solution to separation of the emetine as a crystalline compound, the cephaeline remaining in solution.

3. As a new chemical product crystals of hydrobromate of emetine and water of crystallization.

In witness whereof I have hereunto set my hand in presence of two witnesses.

WILLIAM GEORGE WHIFFEN.

Witnesses:
GEORGE HUGHES,
W. M. HARRIS.